United States Patent Office 3,067,207
Patented Dec. 4, 1962

3,067,207
7-AMINOALKOXY-3-ETHYL - 2,3-DIHYDRO-2,2-DI-METHYL-1H-BENZ [e] INDEN-1-ONES AND INTERMEDIATES
Leland J. Chinn, Morton Grove, Ill., assignor to G. D. Searle & Co., Chicago, Ill., a corporation of Delaware
No Drawing. Filed June 1, 1961, Ser. No. 114,015
6 Claims. (Cl. 260—326.5)

This invention relates to 7-aminoalkoxy-3-ethyl-2,3-dihydro-2,2-dimethyl-1H-benz[e]inden-1-ones, intermediates thereto, and the manufacture thereof. More particularly, this invention relates to chemical compounds of the formula

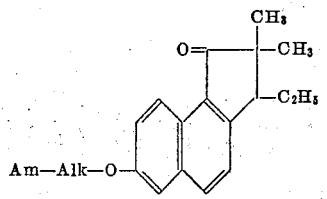

wherein Am represents an optionally-alkylated amino radical and Alk represents an alkylene radical.

The optionally-alkylated amino radicals comprehended by Am include in addition to the unsubstituted radical, —$NH_2$, the amino radical as modified by introduction of 1 or 2 alkyl radicals replacing hydrogen. Especially lower alkyl radicals are preferred for this purpose, specifically, methyl, ethyl, propyl, isopropyl, butyl, sec-butyl, tert-butyl, pentyl, neopentyl, hexyl, heptyl, and isomeric monovalent hydrocarbon groupings of the formula

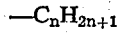
—$C_nH_{2n+1}$ wherein $n$ represents a positive integer less than 8. When two alkyl groupings are present, these may be either discrete, as where Am designates a radical of the formula

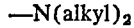
—$N(alkyl)_2$ or they may be joined together directly or through oxygen or a second nitrogen to compose a radical comprising at least 4 and not more than 7 carbon atoms arranged to form a 5- or 6-membered heterocycle. Such heterocycle, if it contains oxygen or a second nitrogen (which can be substituted by a lower alkyl radical) is ordinarily 6-membered, the oxygen or second nitrogen being disposed para to the nitrogen attached to the radical represented in the foregoing generic formula by Alk. Examples of heterocyclic radicals of this type are the morpholino and 1-piperazinyl moieties.

Illustrative of cyclic amino radicals contemplate by Am, in addition to the morpholino and 1-piperazinyl groupings named above, are 2-methyl-1-pyrrolidinyl, 2,5-dimethyl-1-pyrrolidinyl, 2,2,4-trimethyl-1-pyrrolidinyl, 3-methyl-4-ethyl-1-pyrrolidinyl, piperidino, 3-methylpiperidino, 2,6-dimethylpiperidino, 2-methyl-5-ethylpiperidino, 4-methyl-1-piperazinyl, 4-ethyl-1-piperazinyl, etc. Among these the 1-pyrrolidinyl and piperidino groupings are radicals of choice, together with the di(lower alkyl) amino groupings previously described.

The alkylene radicals represented by Alk in the generic formula are such as ethylene, trimethylene, propylene, tetramethylene, 2-methyl-1,2-propylene, pentamethylene, 2,4-pentylene, 2,2-dimethyl-1,3-propylene, and like bivalent saturated acyclic straight- or branched-chain hydrocarbon groupings separating the groups attached thereto by more than 1 carbon atom and having the formula

—$C_mH_{2m}$— wherein $m$ represents a positive integer commonly less than 6.

Equivalent to the hereinabove-described amines for purposes of the present invention are their nontoxic acid addition salts, the composition of which is depicted by

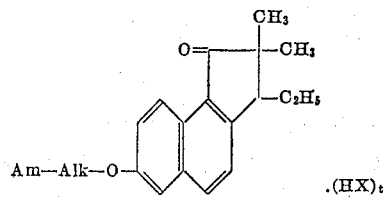

wherein Am and Alk have the meanings previously assigned; X represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $t$ represents 1 except when Am comprises 2 nitrogens, in which case $t$ represents a positive integer less than 3.

The compounds to which this invention relates are useful because of their valuable pharmacological properties. Thus, for example, they are anti-biotics variously effective against bacteria such as *Diplococcus pneumoniae*, fungi such as *Tricophyton mentagrophytes*, algae such as *Chlorella vulgaris*, and cotyledenous seed germination. Further, they inhibit experimentally-induced hypercholesterolemia, and are anti-arrhythmic agents.

Manufacture of the subject products proceeds by contacting 3-(6-methoxy-2-naphthyl)-2,2-dimethylpentanoic acid with hydrogen fluoride to form 3-ethyl-2,3-dihydro-7-methoxy-2,2-dimethyl-1H-benz[e]iden-1-one, which, in turn, is heated in an inert atmosphere with pyridine hydrochloride to cleave the 7-methoxy group. The 3-ethyl-2,3-dihydro-7-hydroxy-2,2-dimethyl-1H - benz[e]inden-1-one thus obtained is converted under nitrogen to the sodio derivative by heating with sodium amide in an anhydrous solvent such as toluene, whereupon a selected haloalkylamine

Am—Alk—Cl is introduced and heating under nitrogen continued to give the desired aminoalkoxy base hereof. [Am and Alk in the formula for the haloalkylamine have the same significance as before.] As an exception to this procedure, 3-ethyl-2,3-dihydro-7-hydroxy-2,2-dimethyl - 1H-benz[e]inden-1-one, upon being heated with propylene oxide under the influence of sodium ethoxide in dioxane solution, is converted to 3-ethyl-2,3-dihydro-7-(β-hydroxypropoxy)-2,2-dimethyl - 1H - benz[e]inden-1-one, wherein the hydroxyl is replaced with chlorine on contact with thionyl chloride catalyzed by pyridine in benzene solution. The resultant chloro compound affords 3-ethyl-2,3-dihydro-2,2-dimethyl-7-(β - methyl-β-piperidinoethoxy)-1H-benz[e]inden-1-one upon being heated with piperidine in benzene solution.

The acid addition salts of the disclosed amine bases are obtained simply by mixing stoichiometric quantities of the bases with any of various inorganic and strong organic acids in which the anionic component can be represented by X as hereinabove defined.

The following examples describe in detail compounds illustrative of the present invention and methods which have been devised for their manufacture. However, the invention is not to be construed as limited thereby, either in spirit or scope, since it will be apparent to those skilled in the art of organic synthesis that many modifications, both of materials and methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *3-ethyl-2,3-dihydro - 7 - methoxy-2,2-dimethyl-1H-benz[e]inden-1-one.*—A mixture of 25 parts of 3-(6-methoxy-2-naphthyl)-2,2-dimethylpentanoic acid and 250 parts of hydrogen fluoride is allowed to evaporate to dryness during 17 hours. The residue is taken up in ether. The ether solution is washed successively with water, aqueous 2% sodium hydroxide, and a saturated aqueous solution of sodium chloride, whereupon it is dried over anhydrous sodium sulfate and then stripped of solvent by vacuum distillation. The residue thus obtained, crystallized from hexane, affords 3-ethyl-2,3-dihydro-7-methoxy-2,2-dimethyl-1H-benz[e]inden-1-one as colorless rhombohedrons melting at approximately 86–87°.

B. *3-ethyl - 2,3 - dihydro-7-methoxy-2,2-dimethyl-1H-benz[e]inden-1-one.*—A mixture of 3 parts of 3-ethyl-2,3-dihydro-7-methoxy-2,2-dimethyl-1H - benz[e]inden-1-one and 22 parts of pyridine hydrochloride is maintained at 211° in an atmosphere of nitrogen for 45 minutes, then cooled and triturated with water. Solids are filtered off, washed with water, and finally crystallized from aqueous methanol to afford 3-ethyl-2,3-dihydro-7-hydroxy-2,2-dimethyl-1H-benz[e]inden-1-one as colorless needles melting at 156–160°.

C. *3-ethyl-7-(2-diethylaminoethoxy)-2,3-dihydro - 2,2-dimethyl-1H-benz[e]inden-1-one.*—To a solution of 100 parts of 3-ethyl-2,3-dihydro-7-hydroxy-2,2-dimethyl-1H-benz[e]inden-1-one in 900 parts of anhydrous toluene is added 17 parts of sodium amide. The resultant mixture is heated with agitation at the boiling point under reflux in an atmosphere of nitrogen for 2 hours, then diluted with an additional 450 parts of anhydrous toluene. A solution of 60 parts of 2-diethylaminoethyl chloride in 90 parts of anhydrous toluene is thereupon slowly introduced, following which heating at the boiling point under reflux in a nitrogen atmosphere is resumed for 17 hours. An equal volume of water is then mixed in and the toluene phase separated and washed successively with aqueous 5% sodium hydroxide, water, and a saturated aqueous sodium chloride solution. Dried over anhydrous sodium sulfate and stripped of solvent by vacuum distillation, the toluene solution affords a viscous brown residue 3-ethyl-7-(2-diethylaminoethoxy)-2,3-dihydro-2,2-dimethyl-1H-benz[e]-inden-1-one. The product has the formula

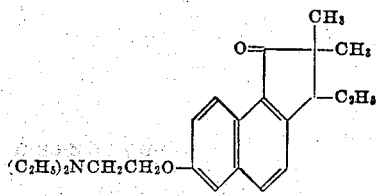

D. *3-ethyl - 7 - (β-diethylaminoethoxy)-2,3-dihydro-2, 2-dimethyl-1H - benz[e]inden-1-one hydrochloride.*—Dissolution of the base of the foregoing Part C of this example in a minimum amount of 2-propanol and addition to the resultant solution of just sufficient hydrogen chloride dissolved in 2-propanol to induce acidity affords, upon dilution with anhydrous ether, an oil which granulates on standing. The granular product, collected on a filter and crystallized from ethyl acetate, is obtained as colorless laths melting at 135–137°. This material is 3-ethyl-7-(β-diethylaminoethoxy)2,3-dihydro-2,2-dimethyl - 1H-benz-[e]inden-1-one hydrochloride.

*Example 2*

*3-ethyl-2,3-dihydro - 2,2 - dimethyl-7-(ω-dimethyl - aminopentoxy)-1H-benz[e]inden-1-one.*—Substitution of 66 parts of 5-dimethylaminopentyl chloride for the 2-diethylaminoethyl chloride called for in Example 1C affords, by the procedure there detailed, 3-ethyl-2,3-dihydro-2,2-dimethyl - 7 - (ω-dimethylaminopentoxy)-1H-benz[e]inden-1-one of the formula

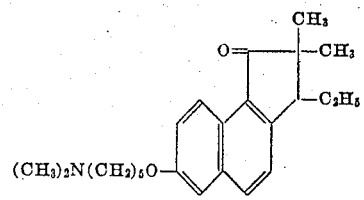

*Example 3*

A. *3 - ethyl - 2,3 - dihydro - 2,2 - dimethyl - 7-[β-(1-pyrrolidinyl)ethoxy]-1H - benz[e]inden-1-one.*—Substitution of 60 parts of 2-(1-pyrrolidinyl)ethyl chloride for the 2-diethylaminoethyl chloride called for in Example 1C affords, by the procedure there detailed, 3-ethyl-2,3-dihydro-2,2-dimethyl-7-[β-(1-pyrrolidinyl)ethoxy] - 1H-benz[e]inden-1-one as a viscous oil. The product has the formula

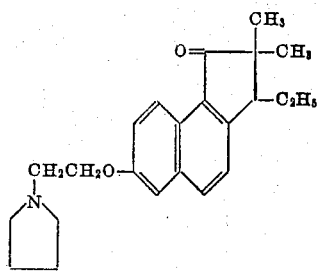

B. *3 - ethyl - 2,3 - dihydro - 2,2 - dimethyl - 7 - [β-(1-pyrrolidinyl)ethoxy] - 1H - benz[e]inden - 1 - one hydrochloride.*—Conversion of the base of the foregoing Part A of this example to the corresponding hydrochloric acid salt by the technique of Example 1D affords 3-ethyl-2,3-dihydro - 2,2-dimethyl - 7 - [β(1-pyrrolidinyl)ethoxy]-1H-benz[e]inden-1-one hydrochloride as colorless rhomohedrons melting at 189–191°.

*Example 4*

A. *3 - ethyl - 2,3 - dihydro - 7 - (β-hydroxypropoxy)-2,2-dimethyl-1H-benz[e]inden-1-one.*—A mixture of 100 parts of 3-ethyl-2,3-dihydro-7-hydroxy-2,2-dimethyl-1H-benz[e]inden-1-one, 2 parts of sodium ethoxide, 25 parts of propylene oxide, and 200 parts of dioxane is maintained at 100° in an autoclave for 15 hours. The resultant mixture is cooled and then distilled to dryness in vacuo. The residue is partitioned between chloroform and aqueous 5% sodium hydroxide. The chloroform phase is separated and washed successively with water and saturated aqueous sodium chloride. It is then dried over anhydrous sodium sulfate and stripped of solvent by vacuum distillation. The residue is the desired 3-ethyl-2,3-dihydro-7-(β-hydroxypropoxy)-2,2-dimethyl-1H-benz[e]inden-1-one.

B. *7 - (β-chloropropoxy) - 3 - ethyl - 2,3 - dihydro - 2, 2-dimethyl-1H-benz[e]inden-1-one.*—To a solution of 100 parts of 3-ethyl-2,3-dihydro-7-(β-hydroxypropoxy)-2,2-dimethyl-1H-benz[e]inden-1-one in 450 parts of benzene at 0–5° is added 164 parts of thionyl chloride and 2 parts of pyridine. The resultant mixture is let stand at room temperatures for one hour and then stripped of solvent and excess thionyl chloride by vacuum distillation at 30°. The residue is 7-(β-chloropropoxy)-3-ethyl-2,3-dihydro-2, 2-dimethyl-1H-benz[e]inden-1-one.

C. *3 - ethyl - 2,3 - dihydro - 2,2 - dimethyl - 7 - (β-methyl-β-piperidinoethoxy) - 1H - benz[e]inden-1-one.*—To a solution of 100 parts of 7-(β-chloropropoxy)-3-ethyl-2,3-dihydro-2,2-dimethyl-1H-benz[e]inden-1-one in 450 parts of benzene is added 100 parts of piperidine. The resultant mixture is heated at the boiling point under reflux for 2 hours, then cooled and filtered. The filtrate, stripped of solvent by vacuum distillation, affords as the residue 3-ethyl - 2,3 - dihydro - 2,2 - dimethyl - 7 - (β-methyl-β-piperidinoethoxy)-1H-benz[e]inden-1-one, having the formula

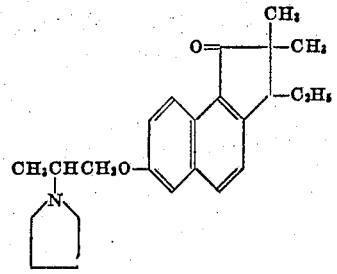

What is claimed is:
1. A compound of the formula

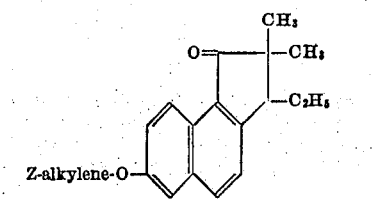

wherein Z represents a member of the group consisting of amino radicals of the formulas

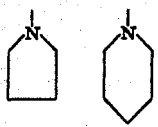

and the alkylene radical called for separates the groups attached thereto by more than 1 carbon atom and contains fewer than 6 carbon atoms.

2. A compound of the formula

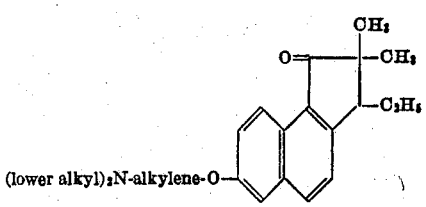

wherein the alkylene radical called for separates the groups attached thereto by more than 1 carbon atom and contains fewer than 6 carbon atoms.

3. 3 - ethyl - 7 - (β-diethylaminoethoxy) - 2,3 - dihydro-2,2-dimethyl-1H-benz[e]inden-1-one.

4. 3 - ethyl - 2,3 - dihydro - 2,2 - dimethyl - 7 - [β-(1-pyrrolidinyl)ethoxy]-1H-benz[e]inden-1-one.

5. 3 - ethyl - 2,3 - dihydro - 7 - methoxy - 2,2 - dimethyl-1H-benz[e]inden-1-one.

6. 3 - ethyl - 2,3 - dihydro - 7 - hydroxy-2,2-dimethyl-1H-benz[e]inden-1-one.

No references cited.